(12) United States Patent
Green

(10) Patent No.: US 10,376,099 B2
(45) Date of Patent: Aug. 13, 2019

(54) MULTI-USE FLAT PACK PRODUCT AND METHOD

(71) Applicant: Eric M. Green, Lakeport, CA (US)

(72) Inventor: Eric M. Green, Lakeport, CA (US)

(73) Assignee: YULANG JIANG, Atlanta, GA (US)

( * ) Notice: Subject to any disclaimer, the term of this patent is extended or adjusted under 35 U.S.C. 154(b) by 636 days.

(21) Appl. No.: 14/919,266

(22) Filed: Oct. 21, 2015

(65) Prior Publication Data

US 2016/0309662 A1 Oct. 27, 2016

Related U.S. Application Data

(60) Provisional application No. 62/150,342, filed on Apr. 21, 2015.

(51) Int. Cl.
| | |
|---|---|
| *A47J 37/00* | (2006.01) |
| *A47J 37/07* | (2006.01) |
| *A47J 33/00* | (2006.01) |
| *A47J 36/26* | (2006.01) |
| *A47B 3/06* | (2006.01) |
| *A47C 4/02* | (2006.01) |

(52) U.S. Cl.
CPC .......... *A47J 37/0763* (2013.01); *A47J 33/00* (2013.01); *A47J 36/26* (2013.01); *A47J 37/07* (2013.01); *A47B 3/06* (2013.01); *A47B 2230/0092* (2013.01); *A47C 4/021* (2013.01)

(58) Field of Classification Search
CPC .......... A01G 9/02; A01G 47/00; A47C 4/021; A47C 7/00; A47B 3/063; A47J 37/0763; A47J 33/00; A47J 36/26; A47J 37/07; A47J 37/079
See application file for complete search history.

(56) References Cited

U.S. PATENT DOCUMENTS

| | | | | |
|---|---|---|---|---|
| 2,665,433 | A * | 1/1954 | Weidt | A47C 4/021 5/285 |
| 5,778,465 | A * | 7/1998 | Myers | A47D 7/04 5/93.1 |
| 2009/0066140 | A1* | 3/2009 | Berent | A47B 3/06 297/440.13 |
| 2012/0137429 | A1* | 6/2012 | Aaron | A47D 7/005 5/93.1 |

* cited by examiner

*Primary Examiner* — Walter Aughenbaugh
(74) *Attorney, Agent, or Firm* — Nixon & Vanderhye P.C.

(57) ABSTRACT

A multi-use flat pack product includes two side panels each with a pair of upper slots and two end panels each with a pair of lower slots. The two side panels are respectively engageable with the two end panels without tools or additional connectors via engagements between the upper slots and the lower slots to define a four-sided construction. A base plate is positionable inside the four-sided construction.

7 Claims, 8 Drawing Sheets

MULTI-USE FLAT PACK PRODUCT AND METHOD

CROSS-REFERENCES TO RELATED APPLICATIONS

This application claims the benefit of U.S. Provisional Patent Application No. 62/150,342, filed Apr. 21, 2015, the entire content of which is herein incorporated by reference.

STATEMENT REGARDING FEDERALLY SPONSORED RESEARCH OR DEVELOPMENT (NOT APPLICABLE)

BACKGROUND OF THE INVENTION

The invention relates to a multi-use flat pack product and method of assembly and, more particularly, to a multi-use flat pack product that is easily assembled without tools or additional connectors and has a variety of uses.

A flat pack product is a piece of furniture or other equipment that is sold in pieces packed flat in a box for easy transport and is assembled by the buyer. Such flat pack products are available from furniture stores that specialize in buyer-assembled furniture as well as large box retail stores. Existing products, however, can be difficult to assemble with many assembly steps and various pieces and parts requiring tools and additional fastening components for assembly. Additionally, existing flat pack products are typically designed for a single intended use.

BRIEF SUMMARY OF THE INVENTION

The multi-use flat pack product according to preferred embodiments is a multi-functional flat pack product that can be used as a planter, a fire pit, a stool, a table, a grill, and the like. The product is readily assembled without tools or additional connectors by engagements between slotted panels. The design is scalable to a variety of sizes while keeping the same functionality and aesthetic.

An example assembly is 18"×18"×18" and has multiple uses even though it is the same size. The 18"×18"×18" assembly can be used as a stool with a wood top, a planter without the wood top, a fire pit, a table with incorporation of the wood top, and the like. Essentially, a variety of uses are available for each size, and the concept is scalable to multiple dimensions and uses. Alternative sizes such as 6"×6"×6" or 12"×6"×6" can be accommodated, although other sizes and combinations can be contemplated, and the invention is not meant to be limited to the exemplary sizes described and shown in the drawings. The 6" tall assembly may be a square or a rectangle. Each product can be used as a planter or fire feature, and each product uses the same joining system regardless of the dimensions.

In an exemplary embodiment, a multi-use flat pack product includes two side panels tapering in width from top to bottom, where each of the side panels has a pair of upper slots extending from the top to an ending point between the top and the bottom. Each of two end panels also tapering in width from top to bottom has a pair of lower slots extending from a starting point between the top and the bottom of the end panels to the bottom. The flat pack product also includes a base plate. The two side panels are respectively engageable with the two end panels via engagements between the upper slots and the lower slots to define a four-sided construction, wherein the base plate is positionable inside the four-sided construction.

At least one pair of the two side panels and the two end panels may include an opening adjacent the side panel top or end panel top, respectively, where the openings define a gripping handle for the four-sided construction. A top panel, such as a wood panel, may be positionable on top of the four-sided construction. The two side panels and the two end panels may be the same height. The two side panels may be wider than the two end panels. At least one of the two side panels and at least one of the two end panels may include a pressed point on which the base plate rests in the four-sided construction. The upper slots may be narrowed at the ending point and/or the lower slots may be narrowed at the starting point.

In one arrangement, the product may include a heating panel that is larger than the base plate and a cooking panel that is larger than the heating panel. A drip tray may be positionable in the four-sided construction between the base plate and the heating panel.

In another exemplary embodiment, a multi-use flat pack product includes two side panels, each including a pair of upper slots; two end panels, each including a pair of lower slots; and a base plate. The two side panels are respectively engageable with the two end panels without tools or additional connectors via engagements between the upper slots and the lower slots to define a four-sided construction, wherein the base plate is positionable inside the four-sided construction. The four-sided construction is suitable for use as a planter, a fire pit, and a grill. With a top panel positionable on top of the four-sided construction, the four-sided construction is suitable for use as a table and a stool. Disassembled, the side panels, the end panels and the base plate may be stackable into a flat pack.

In still another exemplary embodiment, a method of assembling a multi-use flat pack product includes the steps of connecting the pair of lower slots on one of the end panels with one of the upper slots on each of the side panels; connecting the pair of lower slots on the other of the end panels with the other of the upper slots on each of the side panels, thereby defining a four-sided construction; and inserting the base plate inside the four-sided construction. The connecting steps are performed without tools or additional connectors. The method may also include securing the base plate by providing the two side panels and the two end panels with a tapered width from top to bottom. The method may also include securing the base plate by providing at least one of the two side panels and at least one of the two end panels with a pressed point on which the base plate rests in the four-sided construction.

BRIEF DESCRIPTION OF THE DRAWINGS

These and other aspects and advantages will be described in detail with reference to the accompanying drawings, in which.

DETAILED DESCRIPTION OF THE INVENTION

Figure 1:
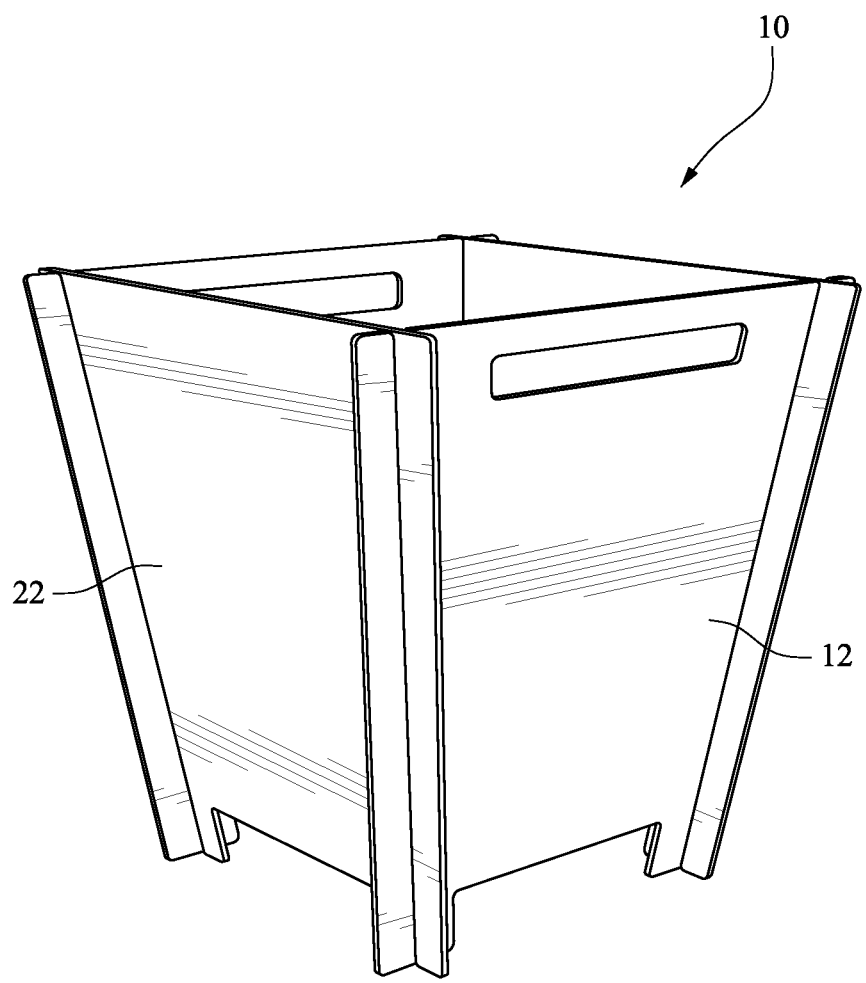
FIG. 1 is a perspective view of an exemplary assembled product.

With reference to the drawings, the multi-use flat pack product 10 according to preferred embodiments includes two side panels 12 tapering in width from a side top 14 to a side bottom 16. Each of the side panels 12 includes a pair of upper slots 18 extending from the side top 14 to an ending point 20 between the side top 14 and the side bottom 16. Two end panels 22 similarly taper in width from an end top 24 to an end bottom 26. Each of the end panels 22 includes a pair of lower slots 28 extending from a starting point 29 positioned between the end top 24 and the end bottom 26 of the end plates to the end bottom 26. The two side panels 12 are respectively connected with the two end panels 22 via engagements between the upper slots 18 and the lower slots 28 to define a four-sided construction (see FIG. 1). A base plate 30 is positionable inside the four-sided construction.

The tapered angle allows for the base plate 30 to be secured within the four-sided construction. The panels 12, 22 may additionally or alternatively be provided with pressed points 32 that create a platform on which the base plate 30 can rest (see FIGS. 3 and 4). The base plate 30 adds extra stability to the product, enhancing support of the panels 12, 22. Notches 31 in the base plate 30 facilitate removal of the base plate 30 if necessary.

Generally, the two side panels 12 and the two end panels 22 are the same height. In some arrangements, one set of the panels 12, 22 may be wider than the other set of the panels 12, 22. The resulting four-sided construction would then be more of a rectangular shape.

At least one pair of the two side panels 12 and the two end panels 22 may include an opening or slot 34 adjacent the side top 14 or end top 24, respectively. The openings 34 define gripping handles for the four-sided construction.

Figure 2:
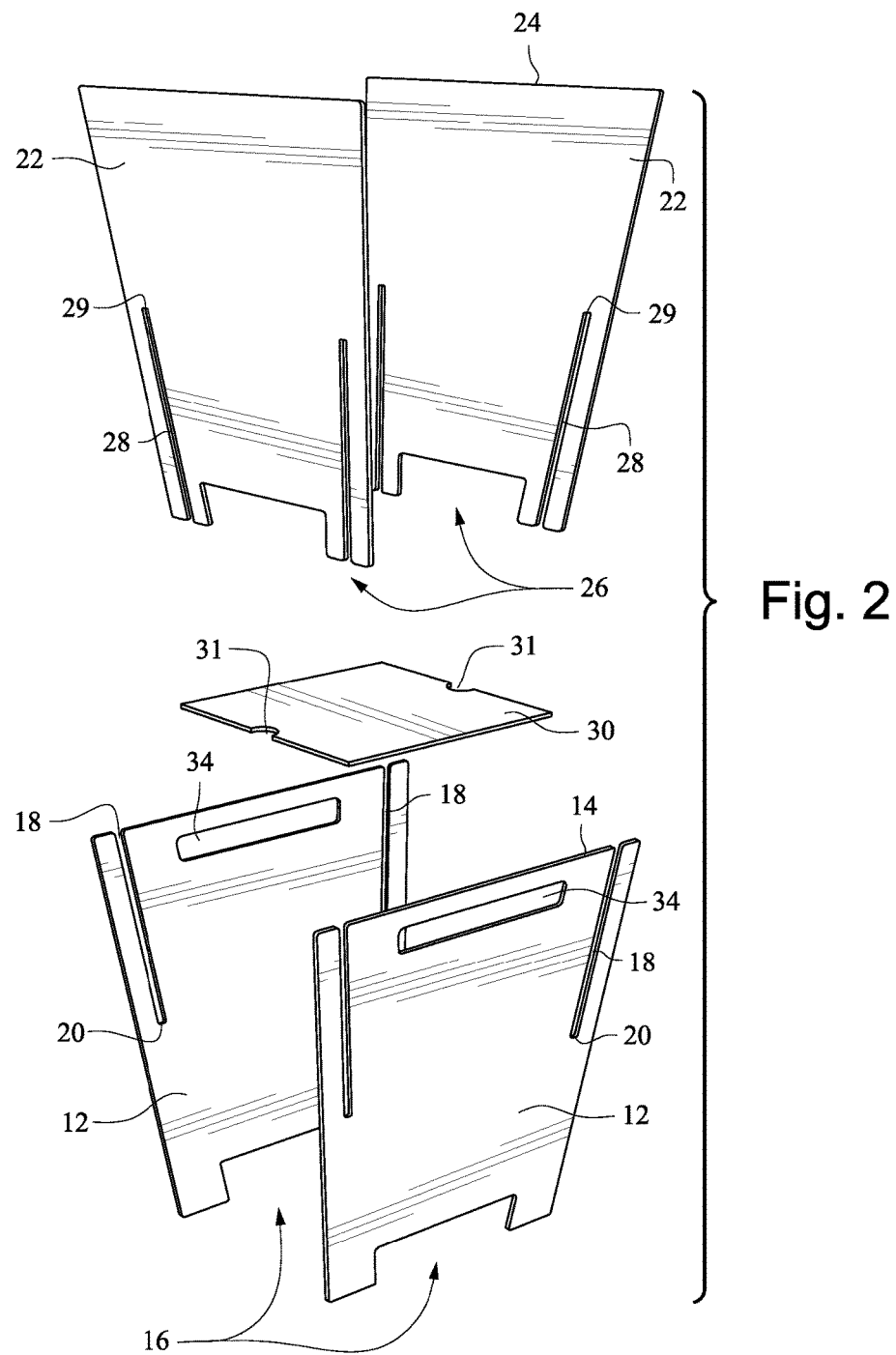
FIG. 2 shows an exploded image of the parts of the product and the method of assembling the product.
Figure 3:
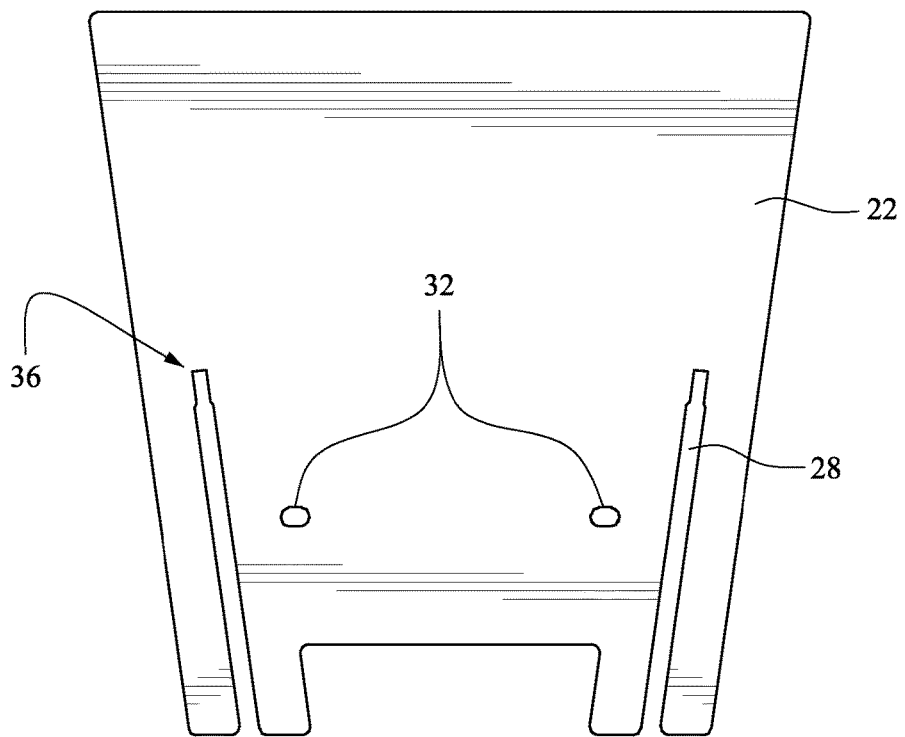
FIG. 3 shows an exemplary panel of the flat pack product.
Figure 4:
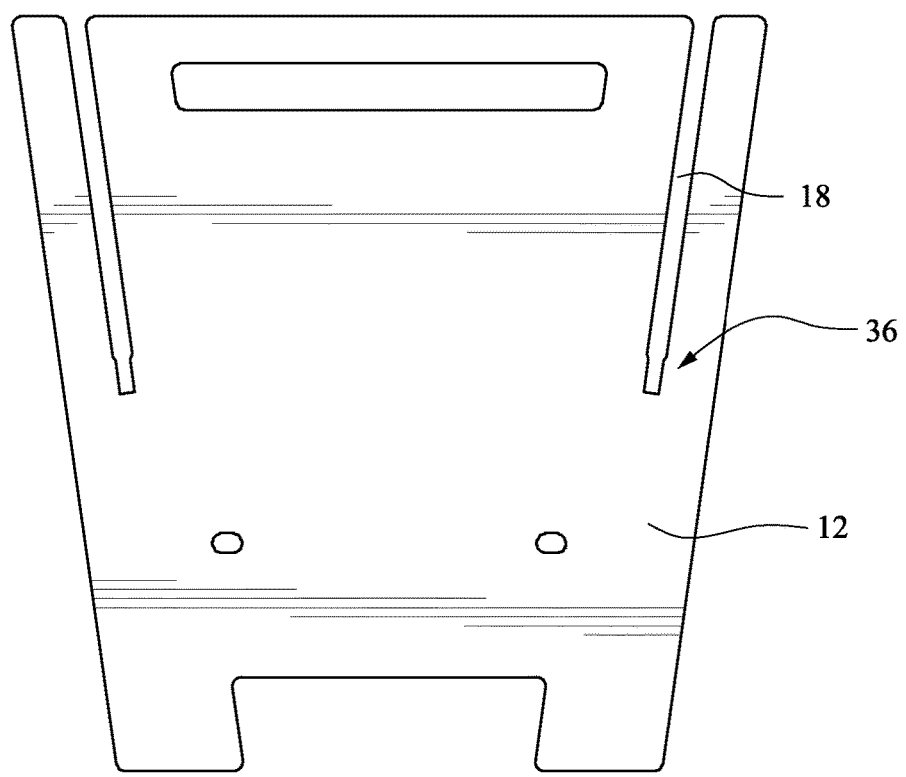
FIG. 4 shows an alternative exemplary panel for the flat pack product.
Figure 5:
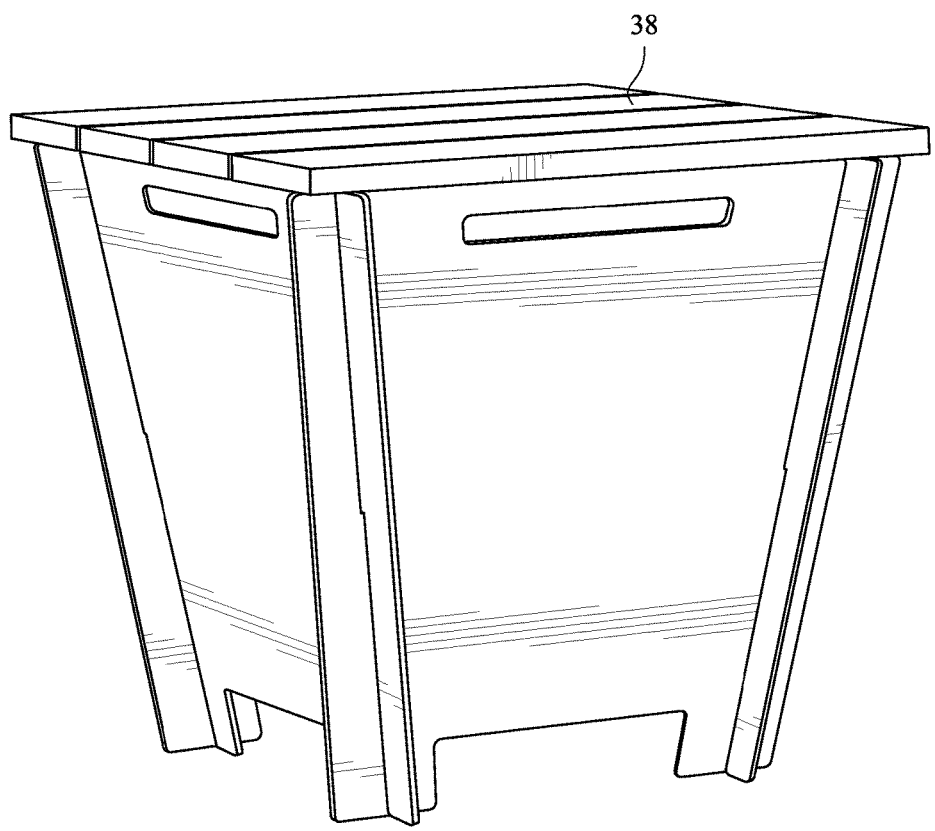
FIGS. 5-9 show exemplary uses of the flat pack product according to preferred embodiments.
Figure 6:
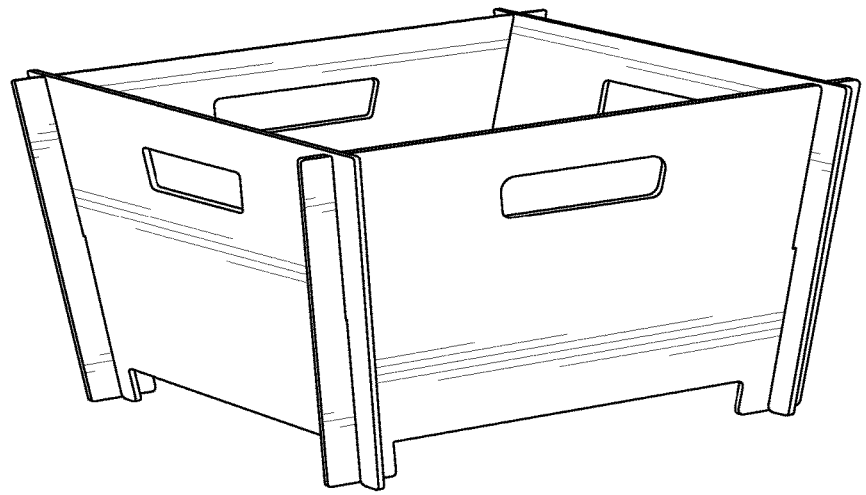
Figure 7:
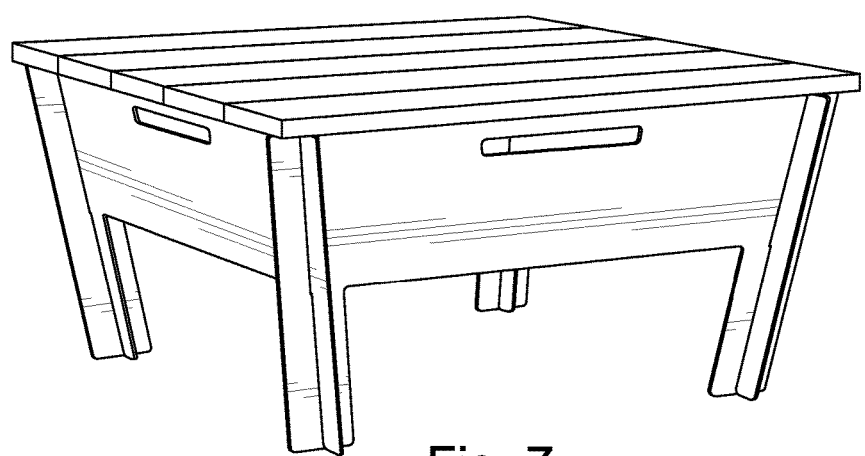

To assemble the multi-use flat pack product, with continued reference to FIG. 2, the pair of lower slots 28 on one of the end panels 22 is connected with one of the upper slots 18 on each of the side panels 12. The pair of lower slots 28 on the other of the end panels 22 is connected with the other of the upper slots 18 on each of the side panels 12. By connecting the slots in this manner, the four-sided construction is defined. The base plate 30 is then inserted inside the four-sided construction. With reference to FIGS. 3 and 4, the slots 18, 28 may be provided with a narrowed section 36 that serves to tighten the end points of the connections between the panels.

FIGS. 5-9 show exemplary applications of the multi-use flat pack product of the preferred embodiments. In one exemplary application, the multi-use flat pack product is provided with a top panel 38 positionable on top of the four-sided construction. The top panel 38 may be a wood panel or other suitable material. With the addition of the top panel 38, the product is suitable for use as a table or a stool or the like. Without using the top panel, the product is suitable for use as a planter or fire pit (see FIG. 6), a container (such as for magazines) and the like.

In an exemplary embodiment, the product is made from aluminum or steel and is powder-coated. Of course, a variety of materials can use the same design providing the same functionality and similar aesthetic. Other suitable materials may include, without limitation, wood, cut stone, glass, plastic, cast concrete, etc. The construction is also suitable for parts made with a 3D printer.

Figure 8:
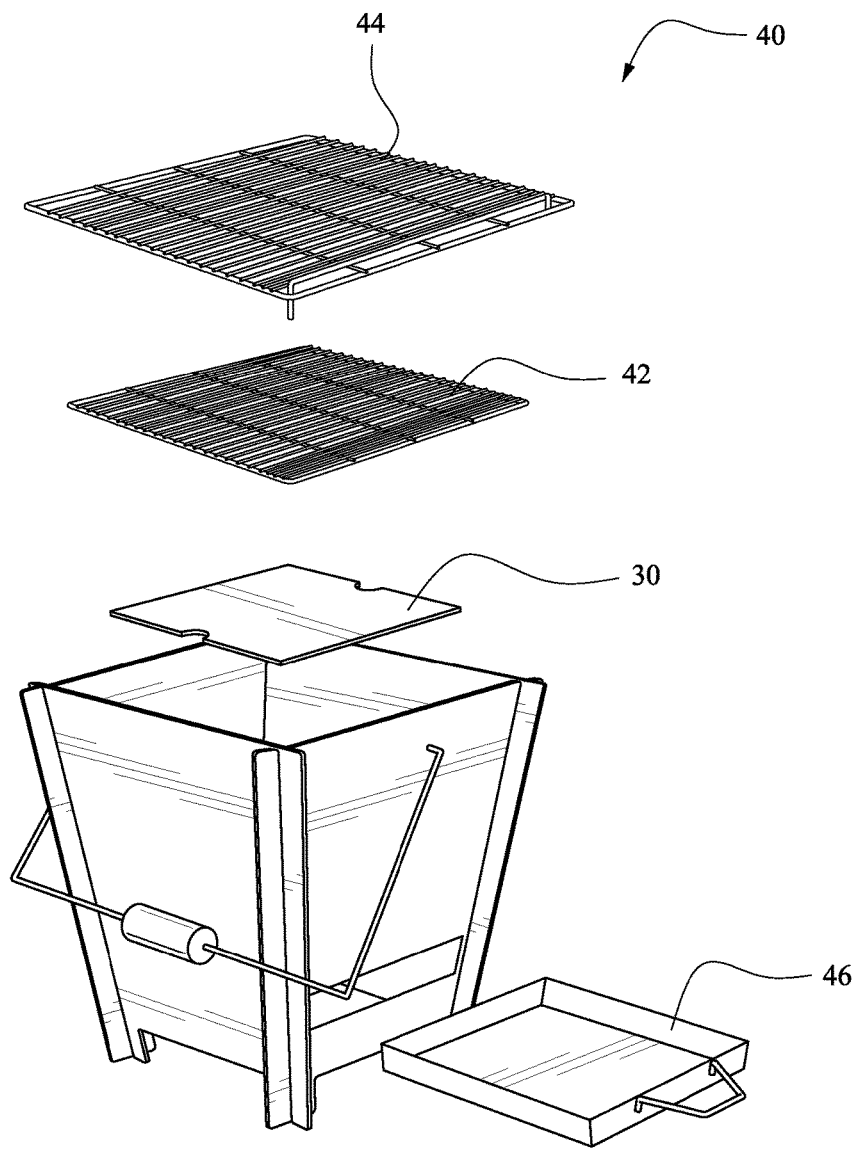
Figure 9:
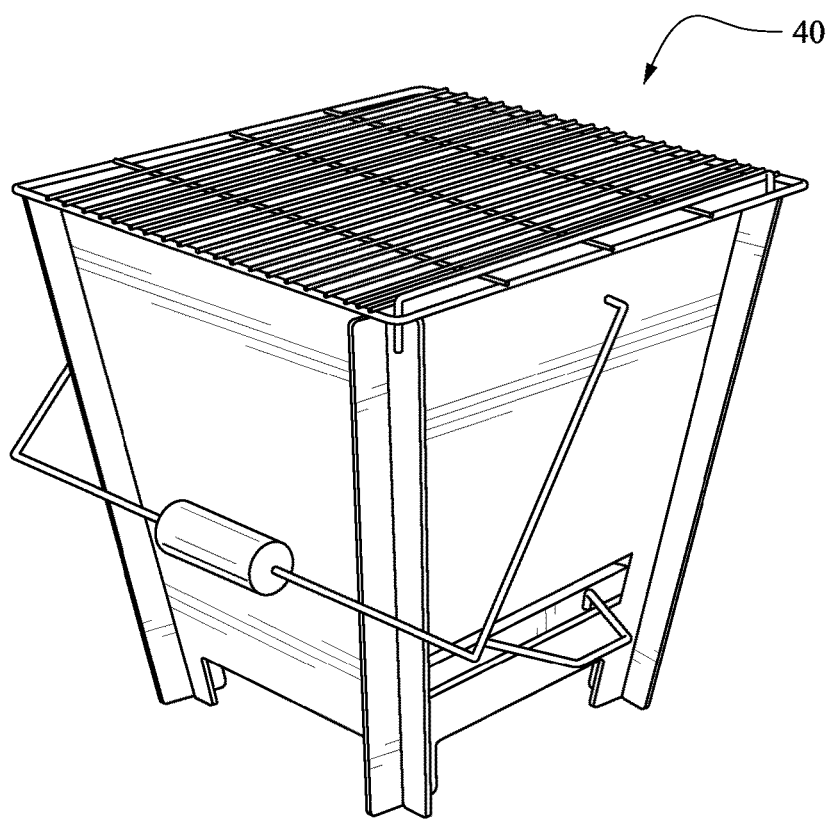

A grill application 40 is shown FIGS. 8 and 9. The grill application 40 preferably includes a heating panel 42 that is larger than the base plate 30 and a cooking panel 44 that is larger than the heating panel 42. The heating panel 42 is intended to support heat rocks or charcoal or the like, and the cooking panel 44 provides a surface on which food items can be cooked. The assembly may also include a drip tray 46 positionable in the four-sided construction between the base plate 30 and the heating panel 42.

As noted, the product can be assembled without tools or additional connectors via engagements between the respective slots. The pieces slide together, and the tapered sides and/or pressed points support the base plate into the interconnected pieces. It is contemplated that a piece could be made to clip onto each of the four corners on the base plate that would prevent the material from scratching the surface and provide additional stability to the overall product. Preferably, this piece could be made from plastic.

The multi-use flat pack product according to the described embodiments is easily shipped and assembled and could be adapted for many uses. The design is scalable to a variety of sizes keeping the same functionality and aesthetic.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A multi-use flat pack product comprising:
two side panels tapering in width from a side top to a side bottom, each of the side panels including a pair of upper slots extending from the side top to an ending point between the side top and the side bottom of the side panels;
two end panels tapering in width from an end top to an end bottom, each of the end panels including a pair of lower slots extending from a starting point between the end top and the end bottom of the end panels to the end bottom;
a rigid base plate; and
a heating panel that is larger than the base plate and a cooking panel that is larger than the heating panel,
wherein the two side panels are respectively engageable with the two end panels by connecting the upper slots and the lower slots to define a four-sided construction, and wherein the base plate is positionable inside the four-sided construction, the base plate removably engaging and supporting interior surfaces of the two side panels and the two end panels to thereby add stability to the multi-use flat pack product.

2. A multi-use flat pack product according to claim 1, wherein at least one pair of the two side panels and the two end panels comprises an opening in each panel adjacent the side top or end top, respectively, the openings defining a gripping handle for the four-sided construction.

3. A multi-use flat pack product according to claim 1, wherein the two side panels and the two end panels are the same height.

4. A multi-use flat pack product according to claim 1, wherein the two side panels are wider than the two end panels.

5. A multi-use flat pack product according to claim 1, wherein the upper slots are narrowed at the ending point or the lower slots are narrowed at the starting point.

6. A multi-use flat pack product according to claim 1, wherein the upper slots are narrowed at the ending point and the lower slots are narrowed at the starting point.

7. A multi-use flat pack product according to claim 1, further comprising a drip tray positionable in the four-sided construction between the base plate and the heating panel.

* * * * *